United States Patent [19]
Jackowski

[11] Patent Number: 5,568,946
[45] Date of Patent: Oct. 29, 1996

[54] SQUEEZE-TO-RELEASE QUICK CONNECTOR WITH SNAP-IN RETAINER

[75] Inventor: Keith T. Jackowski, Romeo, Mich.

[73] Assignee: ITT Corporation, New York, N.Y.

[21] Appl. No.: 355,679

[22] Filed: Dec. 14, 1994

[51] Int. Cl.$^6$ ................................................. F16L 37/084
[52] U.S. Cl. ........................... 285/38; 285/308; 285/319; 285/87; 285/921
[58] Field of Search ............................. 285/38, 308, 319, 285/921, 87, 88, 320

[56] References Cited

U.S. PATENT DOCUMENTS

| | | |
|---|---|---|
| 3,588,149 | 6/1971 | Demler et al. . |
| 3,990,727 | 11/1976 | Gallagher . |
| 4,266,814 | 5/1981 | Gallagher ................... 285/319 |
| 4,641,859 | 2/1987 | Walters ...................... 285/308 |
| 4,681,350 | 7/1987 | Gaita ......................... 285/319 |
| 4,793,639 | 12/1988 | Glover et al. ............... 285/319 |
| 4,804,213 | 2/1989 | Guest ........................ 285/308 |
| 4,844,512 | 7/1989 | Gähwiler . |
| 4,948,175 | 8/1990 | Bartholomew ............. 285/319 |
| 4,991,882 | 2/1991 | Gähwiler . |
| 5,002,315 | 3/1991 | Bartholomew . |
| 5,104,157 | 4/1992 | Bahner . |
| 5,161,832 | 11/1992 | McNaughton et al. ....... 285/319 |
| 5,213,376 | 5/1993 | Szabo . |
| 5,251,940 | 10/1993 | DeMoss ..................... 285/320 |
| 5,284,369 | 2/1994 | Kitamura ................... 285/308 |
| 5,303,963 | 4/1994 | McNaughton et al. ....... 285/319 |
| 5,374,088 | 12/1994 | Moretti ...................... 285/308 |

FOREIGN PATENT DOCUMENTS

| | | |
|---|---|---|
| 0459812 | 12/1991 | European Pat. Off. . |
| 5272 | 11/1882 | United Kingdom ............ 285/81 |
| 9320379 | 10/1993 | WIPO . |

*Primary Examiner*—Terry Lee Melius
*Assistant Examiner*—Heather Chun Shackelford
*Attorney, Agent, or Firm*—Robert P. Seitter; J. Gordon Lewis

[57] ABSTRACT

A quick connector formed of a housing has an internal stepped bore receiving one end of a male connector with a radially enlarged angular flange. A retainer has deflectable fingers which snap into receivers formed on the housing. A cylindrical sleeve is formed on the retainer for insertion into the stepped bore in the housing and forming a bearing seal surface for the end of the male connector. Thin tabs extend from the sleeve to pressure receiving pads which are spaced apart at one end of the retainer and interconnected by arcuate shaped ring members. A finger extends angularly inward from each pad to prevent axial disengagement of the male connector from the housing until the fingers are displaced radially outward by inward pressure on the pads to clear the flange on the male connector.

21 Claims, 3 Drawing Sheets

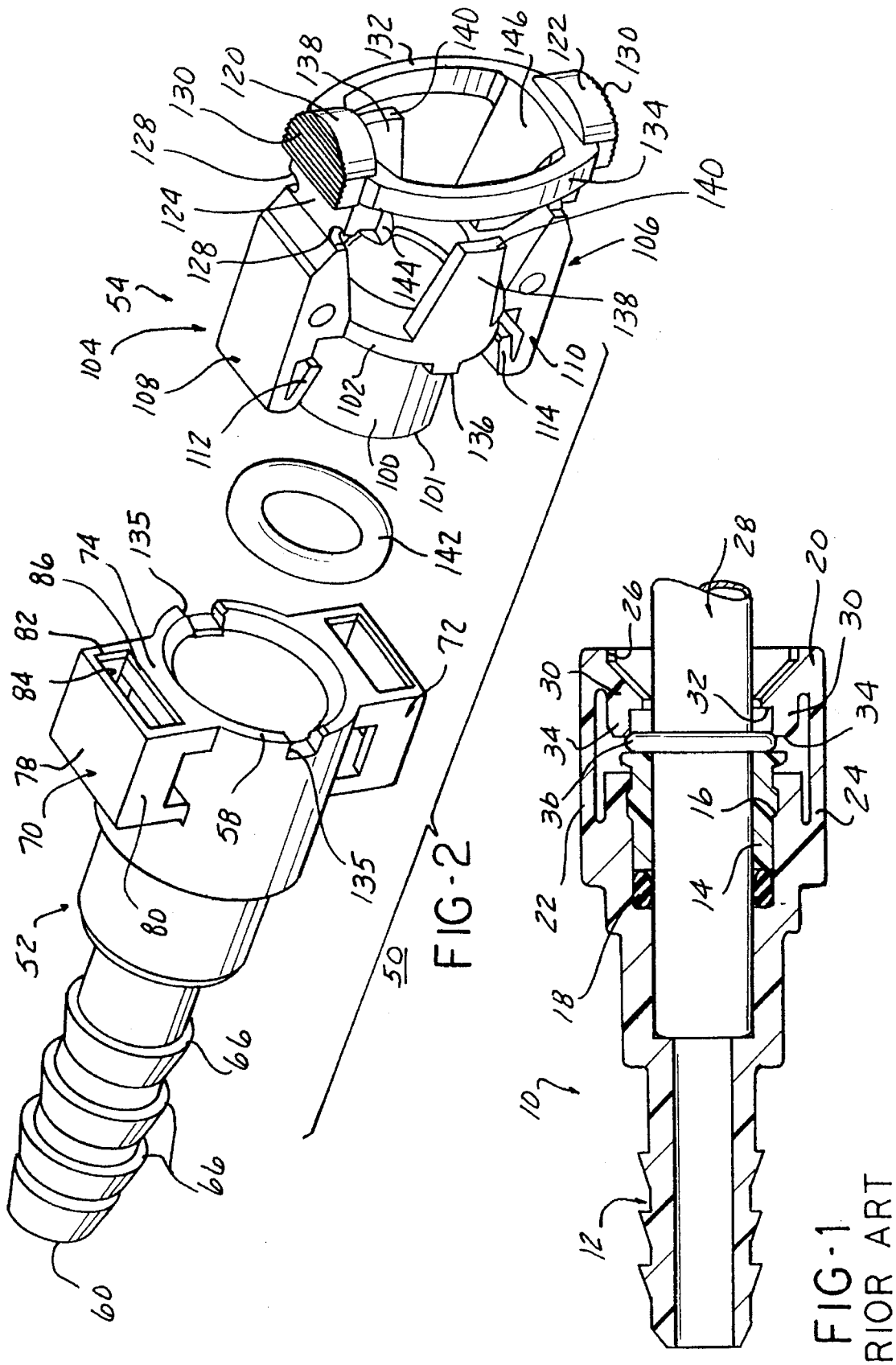

SQUEEZE-TO-RELEASE QUICK CONNECTOR WITH SNAP-IN RETAINER

BACKGROUND OF THE INVENTION

1. Field of the Invention:

The present invention relates to snap-fit or quick connectors, and more particularly to such connectors which are employed in fluid conduit systems to facilitate assembly and disassembly.

2. Description of the Art:

Snap-fit or quick connectors have been found to be useful in a wide range of applications. In particular, they are frequently employed for joining fluid carrying conduits in automotive and industrial applications. Such connectors have found general acceptance as they are typically capable of being closed in a single uniaxial movement which facilitates automated assembly, and entail simple designs which are relatively inexpensive to produce.

A further advantage of quick connect fittings is that they provide an effective seal for handling volatile or hazardous fluids, such as gasoline, while permitting ease of disassembly and reassembly during repair of a host system. Although tools are often required to effect release of quick connect fittings, designs such as those described in U.S. Pat. Nos. 3,990,727, 4,844,512 and 4,991,882 provide for manual release of the fitting without the necessity of separate tools. Although representing an advancement in the art, such "squeeze-to-release" designs often have certain shortcomings.

In applications where hazardous material is to flow through a fitting, prevention of inadvertent release is of primary concern. Accordingly, relatively high axial pull-apart strength specifications are mandated. In order to comply with such specifications, manufacture's of prior art designs typically employed material with a relatively high characteristic flex modulus (such as glass filled Nylon 12) to prevent warping or deformation of abutting locking surfaces within the connector under axial loading conditions. Unfortunately, materials with increased flex modulus are inherently stiffer and can require substantially higher release forces. A related problem is found in that the stiffer material tolerates only relatively short radial displacement of the female connector abutment surface to effect release. This provides relatively little "purchase" (or degree of radial overlap) of the mating abutment surfaces in the engaged condition, thereby exacerbating potential pull apart problems.

Lastly, known prior art designs were prone to fatigue leading to failure after a relatively small number of engagement-disengagement cycles.

The squeeze-to-release quick connector shown in U.S. Pat. No. 5,213,376, assigned to the assignee of the present invention, was designed to overcome these shortcomings. This connector has a pair of parallel arranged beam members, each affixed at one end to a retaining ring and at the other end to a mount located on the outside surface of the body portion of a female connector member. Two or more spaced detents extend inwardly from the retaining ring to capture an abutment surface of a male connector member to effect positive axial engagement between the female and male members. The beam members preferably extend axially a distance approximately equal to the characteristic inner diameter of the body portion of the female member.

While the connector shown in U.S. Pat. No. 5,213,376 provides positive axial engagement and quick and easy squeeze release of the two connector members, it would be desirable to further improve this connector to provide greater flexure for an easier squeeze release with less force; while still retaining positive axial engagement between the two connector members and a high pulloff strength when the connector members are in their connected state.

To meet these objectives, a squeeze-to-release quick connector was developed for the assignee of the subject invention as shown in FIG. 1. This quick connector 10 includes a female connector part 12 having an elongated body with an internal stepped bore extending inward from one end which communicates with a generally cylindrical bore extending to an open second end. A top hat or bushing 14 is fixedly mounted in an undercut 16 formed in the stepped bore. An O-ring seal 18 is also mounted in the stepped bore axially in line with one end of the top hat 14. An annular retaining ring 20 is integrally formed with the female connector 12 and is axially spaced rightwardly, as viewed in FIG. 1, from the open first end of the female connector 12. The retaining ring 20 is joined to the remainder of the female connector 12 by two circumferentially opposed, generally parallel, axially elongated beam members 22 and 24.

The retaining ring 20 has a central opening 26 having a characteristic diameter to provide clearance for the insertion of a male connector part 28 through the retaining ring 20 and into the stepped bore of the female connector part 12. Two circumferentially spaced detents 30 extend radially inward from the retaining ring 20. Each detent 30 is angularly aligned with one of the beam members 22 and 24 and forms a radially tapering ramp surface on a side facing away from the central opening in the retaining ring 20 and a radially transverse abutment surface 32 on a side facing the open first end of the female connector part 12. A finger 34 extends axially from the abutment surface 32 on each detent 30 toward the open first end of the open female connector part 12.

The retaining ring 20 has a profile formed of upper and lower crescent portions joined at the ends thereof through web members to form a generally oval shaped profile.

The portions of the retaining ring 20 adjacent to beam members 22 and 24 are relatively stiff while the web members are relatively compliant. This enables the connector assembly 10 to be released to enable uniaxial separation of the female connector part 12 and the male connector part 28 by grasping and squeezing together grip surfaces formed on the web members. This squeezing action causes the web members to move from their normal position in which each detent 30 engages an enlarged annular flange 36 on the male connector part 28 to a release position in which the detents 30 are momentarily radially displaced outwardly to enable release of the male connector part 28 from the female connector part 12.

While this squeeze-to-release quick connector design has been found to exhibit high pull off forces, and relatively low insertion forces, it would still be desirable to improve on this design to provide a squeeze-to-release quick connector which has higher pull off forces and lower insertion forces. It would also be desirable to provide a squeeze-to-release quick connector which is usable with a standard male connector part or end form having a standard 8.75 mil. SAE standard diameter. It would also be desirable to provide a squeeze-to-release connector which is easy to squeeze to the release position and, even through repeated usage, does not exhibit a deterioration in connector pull out forces.

SUMMARY OF THE INVENTION

The present invention is a squeeze-to-release quick connector which provides significant advantages over previously devised squeeze-to-release quick connectors, particularly with respect to higher pullout forces and reduced insertion forces.

The quick connector of the present invention is adapted to form a fluid sealed coupling between a female connector component and a male connector component typically in the form of a cylindrical member having a outwardly extending angular flange with an abutment surface. The female connector part is in the form of a housing having a through bore extending from a first end to an opposed second end. Receiver means are formed on the housing for receiving a retainer in a detachable snap-together connection.

The retainer is in the form of an annular body having a through bore which is insertible into communication with the through bore in the housing. At least one latch arm is formed on the body of the retainer and is detachably engagable with the receiver means on the housing. Pressure receiving portions are formed on the body of the retainer and pivotally extend from the body of the retainer opposite from the at least one latch arm. A finger extends radially inward from each pressure receiving portion to engage the abutment surface on the flange male connector part to decouplingly mount the male connector part in the housing of the female connector part.

In a preferred embodiment, the pressure receiving portions are preferably in the form of first and second enlarged pads which are each pivotally connected to the body of the retainer by a thin tab extending axially from the body of the retainer. First and second coupling members in the form of arcuate shaped strips or ring members are connected between one edge of each of the first and second pads to retain the first and second pads in a spaced relationship. Preferably the first and second pads are spaced 180° apart on the body of the retainer. At least one and preferably a pair of notches are formed on the juncture of the body of the retainer and each tab to provide for easy flexing of the respective first and second pads with respect to the body.

Further, extensions are formed on the body of the retainer and extend axially from one end of the body toward the arcuate-shaped ring members. The extensions are circumferentially spaced between the tabs connected to the first and second pads.

The receiver means preferably includes a lip extending radially outward from an exterior surface of the body. The lip, in a preferred embodiment, is formed as a part of a hollow receptacle mounted on or integrally formed with the housing. An aperture is formed in one end wall of the receptacle adjacent each lip.

Deflectable latch fingers are formed on the end of the at least one latch arm of the retainer for engaging the lip on the receiver means after the latch arm is inserted through aperture in the receiver means to decouplingly attach the receiver to the housing of the female connector part. Preferably, two spaced latch arms are provided on the retainer and engage two receivers or receptacles on the housing.

The squeeze-to-release quick connector of the present invention provides a significant advancement in the squeeze-to-release quick connector art, particularly by providing higher pullout forces and lower insertion forces than that provided by previously devised squeeze- to-release quick connectors. The retainer employed in the quick connector in the present invention is capable of usage with a standard diameter SAE male component or fitting having a 8.7 mil. outer diameter abutment flange. This eliminates the need for a specially designed male component having a larger radial flange as required in certain previously devised squeeze-to-release quick connectors. The quick connector of the present invention is also capable of repeated flexures without any deterioration in the pullout forces. The provision of easy flexing of the fingers mounted on the retainer of the present quick connector significantly reduces the insertion forces required to insert a male component or fitting into the bore in the housing female component. At the same time, the angular arrangement of the deflectable fingers on the retainer causes the fingers to forcibly engage the abutment surface on the male component to provide substantially higher pullout forces than that provided by previously devised squeeze-to-release quick connectors.

BRIEF DESCRIPTION OF THE DRAWING

The various features, advantages and other uses of the present will become more apparent by referring to the following detailed description and drawing in which:

FIG. 1 is a longitudinal cross-sectional view of a prior art squeeze-to-release quick connector;

FIG. 2 is perspective view of squeeze-to-release quick connector constructed in accordance with the teachings of the present invention;

DESCRIPTION OF THE PREFERRED EMBODIMENT

Figure 3:
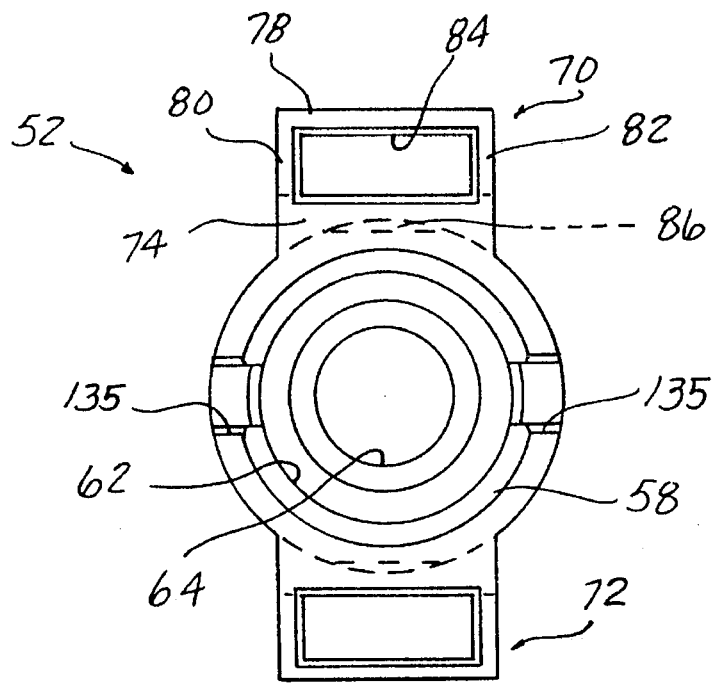
FIG. 3 is right hand end view of the female connector part of the quick connector shown in FIG. 2.
Figure 4:
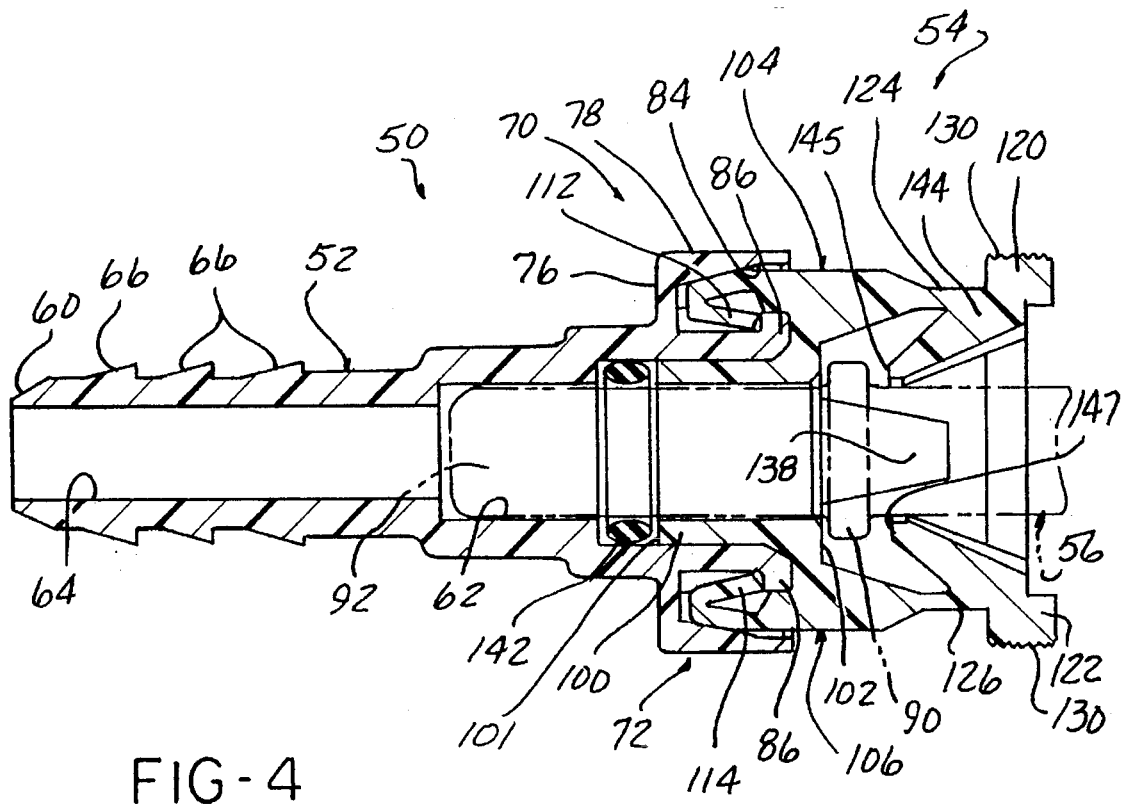
FIG. 4 is a longitudinal cross sectional view 3.
Figure 5:
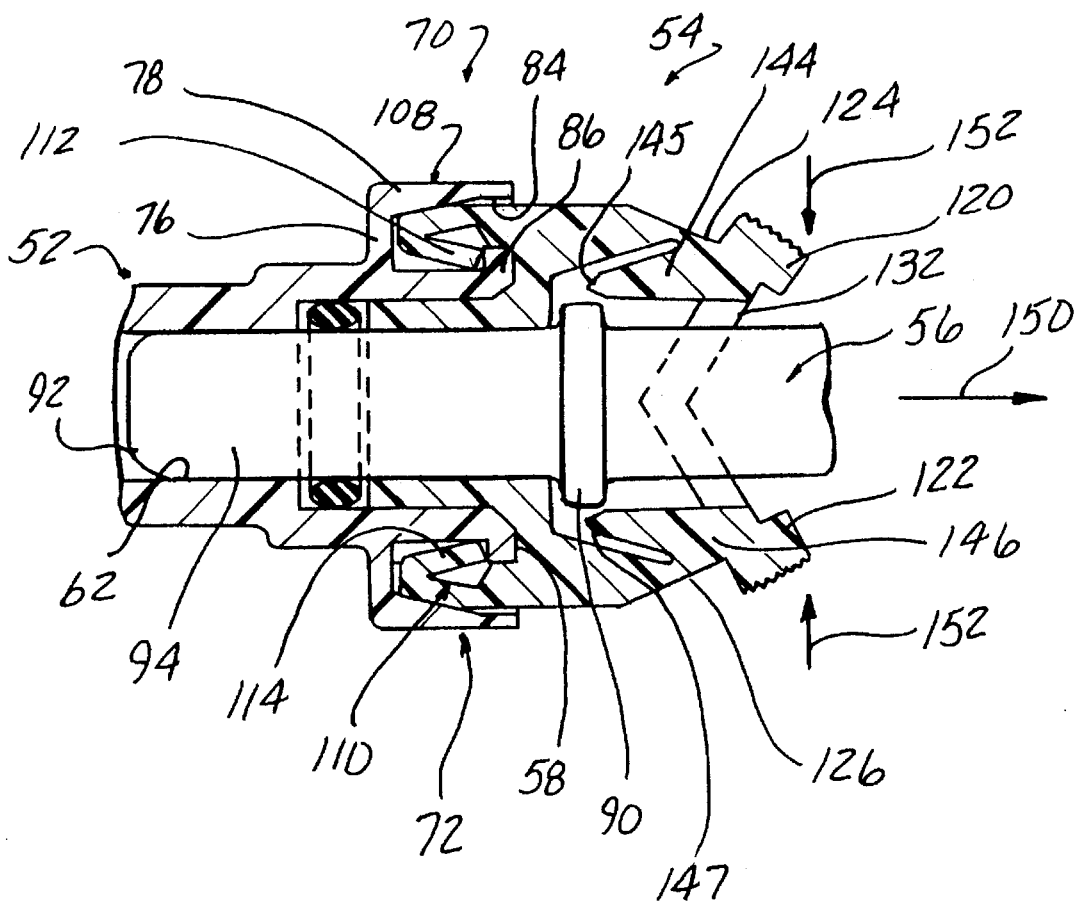
FIG. 5 is a partial cross sectional view, generally similar to FIG. 4, but illustrating portions of the retainer of the quick connector in a release position.

Referring now the drawing, and to FIG. 2, 3, 4 and 5 in particular, there is depicted a squeeze-to-release quick connector 50 of the present invention. The quick connector 50 includes a female connector part 52, a retainer 54 and, as shown in FIG. 5 a male connector part or fitting 56. The quick connector 50 described in detail herein below is adapted for incorporation in a system of tubular conduits for conducting fluid flow. However, it is contemplated, that in the broadest sense, the present inventive quick connector could be readily adapted for other applications in view of the present specification.

The female connector part 52 is in the form of an elongated, hollow housing having a first end 58 and an opposed second end 60. A stepped bore 62 is formed within the female connector part 52 and extends axially from the open first end 58. A generally cylindrical second bore portion 64 is also formed within the female connector part 52 and extends axially from one end of the stepped bore 62 to the open second 60. A plurality of annular barbs 66 are formed on the exterior of a second end portion of the female connector part 52 for receiving a flexible conduit, not shown, thereover.

At lease one and preferably a pair of receiver means denoted generally by reference numbers 70 and 72 are formed on the female connector part 52, as an integral one piece unitary part of the body of the female connector part 52. The receiver means 70 and 72 are diametrically opposed adjacent the open first end 58 of the female connector part 52 and provide a means for detachable receiving and mounting the retainer 54 on the female connector part 52 in the desired orientation.

As each receiver means 70 and 72 as identically constructed, the following description with reference to receiver means 70 will be understood to apply equally to the other receiver means 72. By way of example, the receiver means 70 is in the form of a hollow receptacle, hereafter also denoted by reference number 70, which is attached to or preferably integrally formed with the female connector part 52. The receptacle 70 is formed with a first end wall 74, an opposed second end wall 76, a top wall 78 and opposed side walls 80 and 82. An aperture 84 is formed in the first end wall 74 leaving a raised lip 86 in the end wall 74, the lip 86 extending radially outward from the housing. The radially outward edge of the lip 86 is spaced from the opposed portion of the outer wall 78 thereby forming the aperture 84 with a sufficiently sized opening to receive a portion of the retainer 54 as described hereafter.

As is conventional, the male connector part 56, as shown in FIGS. 4 and 5 is in the form of a conduit or tube having a generally cylindrical, hollow shape. An enlarged, annular, radially outward extending flange 90 is formed on the male connector part 56 spaced from one end 92 of the male connector part 56. A first end portion 94 on the male connector part 56 extending between the one end 92 and the annular flange 90 is adapted to be slidingly inserted into the stepped bore 62 of the female connector part 52 and held in a fluid sealed coupled relationship with the female connector part 52 by means of the retainer 54.

As shown in FIGS. 2, 4 and 5, the retainer 54 is in the form of an integral, one piece body form with a suitable plastic, such as filled Nylon 12. A hollow, generally cylindrical sleeve 100 is formed at one end of the retainer 54 and is adapted to be slidably inserted through the open first end 58 and into the initial portion of the stepped bore 62 in the female connector part 52. The inner surface of the cylindrical sleeve 100 serves as a bushing or bearing surface for the male connector part 56 and eliminates the need for a separate top hat or bushing as used in previous quick connector designs shown in FIG. 1.

An enlarged annular ring 102 is formed at one end of the cylindrical sleeve 100 and forms a mounting base for at least one and preferably a plurality, such as two, latching means 104 and 106. Each latch means 104 and 106 is identically constructed and includes a latch arm 108 and 110, respectably, which extends axially from the annular ring 102 parallel to and spaced from the outer surface of the cylindrical sleeve 100. The outer end of each latch arm 108 and 110 terminates in an angularly bent inward latch finger 112 and 114, respectively, which extends reversely from an outer end of each latch arm 108 and 110 angularly inward toward the ring 102. Each latch finger 112 and 114 is angularly disposed with respect to the adjacent portion of each respective latch arm 108 and 110.

Due to the flexible nature of the plastic material used to form the retainer 54, the latch fingers 112 and 114 are capable of exhibiting movement with respect to the remaining portion of each latch arm 108 and 110 so as to be urged toward the adjacent portion of each latch arm 108 and 110 as the ends of each latch arm 108 and 110 are inserted into the apertures 84 in the receivers 70 and 72, respectively. When the outer free end of each latch finger 112 and 114 clears the lip 86 formed in each receiver 70 and 72, the latch fingers 112 and 114 snap radially inward, as shown in FIG. 4, behind the raised lip 86 to detachably couple the retainer 54 to the female connector part 52. As the aperture 84 formed in each receiver 70 and 72 by the top wall 78, the side walls 80 and 82 and the one end wall 74 has a size approximate the width of each latch arm 108 and 110, the latch arms 108 and 110 are fixably held in a non-rotatable position with respect to the female connector part 52 when the latch arms 106 and 110 are snapped into the respective receiver 70 and 72.

The retainer 54 also includes pressure receiving portions 120 and 122 which are pivotally cantilevered from one end of each latch means 104 and 106, respectively, oppositely from the latch arms 108 and 110. Preferably, thin, flexible tabs 124 and 126 are integrally formed between one end of each latch means 104 and 106, respectively, and one of the pressure receiving portions 120 and 122. A pair of notches denoted generally by reference number 128 are formed in each tab 124 and 126 proximate the juncture of one end of each tab 124 and 126 and one end of the respective latch means 104 and 106 as shown in FIG. 2. This provides a high degree of flexibility for the tabs 124 and 126 and the pressure receiving portions 120 and 122 connected thereto which permits repeated movement of the pressure receiving portions 120 and 122 without any decrease in pull out forces of the quick connector 50 as described hereafter.

Each pressure receiving portion 120 and 122 is generally in the form of an enlarged pad having a suitable finger gripping surface 130 in the form of serrated edge formed on an outer surface thereof.

A pair of generally arcuate shaped, ring members 132 and 134 are integrally formed with and extend from opposite sides of each pressure receiving portion or pad 120 and 122 to the edge of the opposite pad 122 or 120. The ring members 132 and 134 prevent the tabs 124 and 126 from bending outwardly during removal of the male connector part 56 from the female connector part 52.

As shown in FIG. 2, a pair of notches 135 are formed in the first end 58 of the female connector part 52, generally diametrically opposed to each other and located between receivers 70 and 72. The notches 135 receive guide tabs 136 diametrically formed on and projecting axially from the ring 102 of the retainer 54 to guide and align the retainer 54 in the female connector part 52 in the proper orientation.

An addition pair of guide members 138 are also diametrically formed on the retainer 54 and extend from the ring 102 toward the ring members 132 and 134. An outer end 140 of each guide member 138 is spaced from the ring members 132 and 134 as shown in FIG. 2. The guide members 138 prevent any misalignment of the end of the male connector part 56 during insertion of the male connector part 56 through the retainer 54 into the female connector part 52.

A pair of angularly disposed fingers 144 and 146 are integrally formed on the retainer 54 and extend angularly and radially inward from the pads 120 and 122, respectively, as shown in FIGS. 2, 4 and 5. Each finger 144 and 146 terminates in an outer end 145 and 147, respectively, which ends 145 and 147 are spaced apart a distance less than the nominal O.D. of the radially enlarged flange 90 on the male connector part 56. In this manner, the fingers 144 and 146 are capable of angular radially outward displacement during insertion of the male connector part 56 into the female connector part 52 so as to be more radially outward from the nominal position shown in FIG. 4 until the enlarged flange 90 on the male connector part 52 is urged past the ends 145 and 147 of the fingers 144 and 146, respectively. The fingers 144 and 146 then snap back to their nominal position to retain the flange 90 on the male connector part 56 between the ends 145 and 147 of the fingers 144 and 146, respectively, and the end of the ring 102 on the retainer 54.

As shown in FIG. 4, the ends 145 and 147 of the fingers 144 and 146, respectively, are spaced a predetermined distance from the end surface of the ring 102 to allow for angular displacement of the ends 145 and 147 upon the application of pressure to the pads 120 and 122 as described hereafter.

It should also be noted that due to angular disposition of the fingers 144 and 146, any outward force on the male connector part 56 tending to pull the male connector part 56 from the female connector part 52 will cause the ends 145 and 147 of the fingers 144 and 146 to engage a shoulder formed between the flange 90 and the cylindrical body of the male connector part 56 and act as a stop to further disengagement movement of the male connector part 56 relative to the female connector part 52.

The quick connector 50 is also provide with a seal means preferably in the form of an elastomeric O-ring 142 as shown in FIGS. 2 and 4. The O-ring 142 has an O.D. to fit into the step bore 62 of the female connector 52 between an annular shoulder formed in the step bore 62 and the end 101 of the sleeve 100 of the retainer 54. The O-ring 142 and the inner diameter of the sleeve 100 act as sealing surfaces to provide a complete fluid seal between the male connector 56 and the female connector 52.

In use, the retainer 54 is initially coupled to the female connector part 52 by sliding the latch arms 108 and 110 into the respective receivers 70 and 72 until the latch fingers 112 and 114 snap into position behind the raised lips 86 formed in each receiver 70 and 72 as shown in FIG. 4. Next, the end portion 94 of the male connector part 56 is inserted through rings 132 and 134 and the pads 120 and 122 and the cylindrical sleeve 100 of the retainer 54 and into the stepped bore portion 62 of the female part 52 to the position shown in FIGS. 4 and 5. In this position, the fingers 144 and 146 hold the male connector part 52 in the female connector part 52.

When it is desired to decouple the male connecter part 56 from the female connector part 52 by axial movement of the male connector part 56 in the direction of arrow 150 shown in FIG. 5, inward directed pressure or force in the direction of arrows 152 in FIG. 5 is exerted on the pressure receiving portions or pads 120 and 122 causing the pads 120 and 122 to move inward toward each other as well as causing flexing of the rings 132 and 134. This inward movement of the pads 120 and 122 caused the ends 145 and 147 of the fingers 144 and 146 connected to each pad 120 and 122 to also move inward and radially outward. When the pads 120 and 122 have been moved inward a sufficient distance to the position shown in FIG. 5, the ends 145 and 147 of the fingers 144 and 146, respectively, will have moved radially outward a sufficient distance to clear a distance the O.D. of the enlarged flange 90 on the male connector part 56 so as to enable the male part 56 to be moved axially in the direction of the arrow 150 out of the female connector part 52.

In summary, there has disclosed a unique squeeze-to-release quick connector which provides higher pull out forces and reduced insertion forces as compared to previously devised squeeze-to-release quick connectors. The present squeeze-to-release quick connector also is capable of repeated usages without any decrease in the pullout forces.

What is claimed is:

1. A squeeze-to-release quick connector adapted for selective locking engagement with a male connector part having a radially extending abutment surface comprising:

a housing having a through bore extending from a first end to an opposed second end;

a retainer; and receiver means, carried externally on the housing, for receiving the retainer in a detachable connection;

the retainer including:

a body having a through bore, the body mountable through the first end of the housing into the through bore in the housing;

latch means, integrally extending from the body and detachably engagable with the receiver means, for detachably coupling the retainer to the housing;

pressure receiving portions formed on the body of the retainer and pivotally extending from the body;

a finger extending radially and angularly inward from each pressure receiving portion to engage an abutment surface on a male connector part to decouplingly mount the male connector part in the housing, and wherein inward pressure on the pressure receiving portions urges the finger out of engagement with the abutment surface on the male connector allowing separation of the male connector from the housing while the retainer remains connected to the receiver means.

2. The quick connector of claim 1 wherein the pressure receiving portions comprise:

first and second pads; and first and second tabs pivotally connecting the first and second pads, respectively, to the body of the retainer.

3. The quick connector of claim 2 further comprising:

means for coupling the first and second pads together, the coupling means including flexible strips extending between one edge of each of the first and second pads.

4. The quick connector of claim 2 wherein:

the first and second pads are spaced 180° apart on the body of the retainer.

5. The quick connector of claim 2 further comprising:

at least one notch formed at a juncture of the body of the retainer and each of the first and second tabs for flexure of the respective first and second pads with respect to the body.

6. The quick connector of claim 2 further comprising:

flexible strips extending between one edge of each of the first and second pads; and guide members formed on the body of the retainer and extending axially from the body toward the flexible strips, the guide members spaced between the first and second pads.

7. The quick connector of claim 1 wherein the receiver means comprises:

an abutment extending radially with respect to an exterior surface of the housing.

8. A squeeze-to-release quick connector adapted for selective locking engagement with a male connector part having a radially extending abutment surface comprising:

a housing having a through bore extending from a first end to an opposed second end;

a retainer; and receiver means, disposed on the housing, for receiving the retainer in a detachable connection, the receiver means including:

an abutment extending radially with respect to an exterior surface of the housing;

a hollow receptacle having a plurality of exterior walls formed on the housing; and an aperture formed in one of the walls of the receptacle between one wall of the receptacle and the abutment;

the retainer including:

a body having a through bore, the body mountable through the first end of the housing into the through bore in the housing;

latch means, extending from the body and detachably engagable with the receiver means, for detachably coupling the retainer to the housing;

pressure receiving portions formed on the body of the retainer and pivotally extending from the body; and a finger extending radially and angularly inward from each pressure receiving portion to engage an abutment surface on a male connector part to decouplingly mount the male connector part in the housing.

9. The quick connector of claim 8 wherein:

each receptacle is an integral, one piece part of the housing.

10. The quick connector of claim 7 wherein the latch means comprises:

at least one latch arm mounted on the body of the retainer and extending therefrom; and a latch finger integrally extending from one end of the at least one latch arm and angularly spaced from the at least one latch arm, the latch finger engagable with the abutment in the receiver means to detachably couple the retainer to the receiver means.

11. A squeeze-to-release quick connector adapted for selective locking engagement with a male connector part having a radially extending abutment surface comprising:

a housing have a through bore extending from a first end to an opposed second end;

a retainer; and receiver means, carried externally on the housing, for receiving the retainer in a detachable connection, the receiver means including an abutment extending radially outwardly from an exterior surface of the housing; the retainer including:

a body having a through bore, the body mountable through the first end of the housing into the through bore in the housing;

first and second latch arms integrally extending from the body and detachably engagable with the abutment in the receiver means to couple the retainer to the housing;

first and second pressure receiving portions formed on the body of the retainer and pivotally extending from the body in an opposite direction from the first and second latch arms, the pressure portions including first and second enlarged pads each pivotally connected to the body of the retainer by a tab; and a finger extending radially and angularly inward from each of the first and second pads to engage an abutment surface on a male connector part to decouplingly mount the male connector part in the housing.

12. A squeeze-to-release quick connector adapted for selective locking engagement with a male connector part having a radially extending abutment surface comprising:

a housing having a through bore extending from a first end to an opposed second end;

a retainer; and at least two receiver means, disposed on the housing, for receiving the retainer in a detachable, connection, each receiver means including an abutment extending radially outwardly from an exterior surface of the housing;

the retainer including:

a body having a through bore, the body mountable through the first end of the housing into the through bore in the housing;

first and second latch arms extending from the body, each detachably engagable with the abutment in one of the receiver means to couple the retainer to the housing;

first and second pressure receiving portions formed on the body of the retainer and pivotally extending from the body in an opposite direction from the first and second latch arms, the pressure portions including first and second pads each pivotally connected to the body of the retainer by a tab;

means for coupling the first and second pads together, the coupling means including flexible strips extending between one edge of each of the first and second pads; and a finger extending radially and an angularly inward from each of the first and second pads to engage an abutment surface on a male connector part to decouplingly mount the male connector part in the housings.

13. The quick connector of claim 12 wherein:

the first and second pads are spaced 180° apart on the body of the retainer.

14. The quick connector of claim 12 further comprising:

at least one notch formed at a juncture of the body of the retainer and each tab for flexure of the respective first and second pads with respect to the body.

15. The quick connector of claim 12 further comprising:

guide members formed on the body of the retainer and extending axially from the body toward the flexible strips, the guide members circumferentially spaced between the first and second pads.

16. The quick connector of claim 12 wherein the receiver means comprises:

a hollow receptacle having a plurality of exterior walls formed on the housing; and an aperture formed in one of the walls of the receptacle between one wall of the receptacle and the abutment.

17. A squeeze-to-release quick connector adapted for selective locking engagement with a male connector part having a radially extending abutment surface comprising:

a housing have a through bore extending from a first end to an opposed second end;

a retainer; and first and second receivers mounted on the housing, each of the first and second receivers forming a hollow receptacle having a plurality of exterior walls, an aperture formed in one of the exterior walls of the receptacle and forming an abutment;

the retainer including:

an annular body having a through bore, the body mountable through the first end of the housing into the through bore in the housing;

first and second latch arms extending from the body and detachably engagable with the abutment in the fist and second receivers to detachably couple the retainer to the housing;

first and second pressure receiving portion pads formed on the body of the retainer and pivotally extending from the body in an opposite direction from the first and second latch arms, the first and second pads pivotally connected to the body of the retainer by a tab;

a finger extending radially and angularly inward from each first and second pad to engage an abutment surface on a male connector part to decouplingly mount the male connector part in the housing;

flexible strips extending between one edge of each of the first and second pads, the flexible strips spaced apart; and guide members formed on the body of the retainer and extending axially from the body toward the arcuate strips, the guide members circumferentially spaced between the first and second pads.

18. The quick connector of claim 1 further comprising:

cooperatingly engagable alignment means, carried on the housing and the retainer, for circumferentially aligning and maintaining the housing and the retainer in a circumferential relationship to align the latch means with the receiver means.

19. The quick connector of claim 18 wherein the cooperatingly engagable alignment means comprises:

a mating projection and a recess formed on the housing and the retainer.

20. The quick connector of claim 18 wherein:

the cooperatingly engagable alignment means are circumferentially spaced on the housing and the retainer from the receiver means and the latch means.

21. The quick connector of claim 10 further comprising:

the receiver means receiving the latch arm and momentarily compressing the latch finger toward the latch arm prior to engagement of the latch finger with the abutment in the receiver means.

* * * * *